United States Patent [19]

Crededio et al.

[11] Patent Number: 5,435,740

[45] Date of Patent: Jul. 25, 1995

[54] LOCKING SLEEVE CONNECTOR FOR CONDUCTOR CABLE

[75] Inventors: John Crededio; Ron De Rosa, both of Chicago, Ill.

[73] Assignee: Chicago Studio City, Chicago, Ill.

[21] Appl. No.: 49,826

[22] Filed: Apr. 19, 1993

[51] Int. Cl.[6] .......................................... H01R 13/62
[52] U.S. Cl. .................................. 439/320; 439/932
[58] Field of Search .............................. 439/320–323, 439/186, 274, 275, 932, 263

[56] References Cited

U.S. PATENT DOCUMENTS

| | | | |
|---|---|---|---|
| 1,383,040 | 6/1921 | Ahen | 439/320 |
| 2,404,682 | 7/1946 | Baker | 439/263 |
| 2,659,060 | 11/1953 | Cohane | 339/76 |
| 2,755,331 | 7/1956 | Melcher | 174/87 |
| 2,809,360 | 10/1957 | Cobbett | 439/186 |
| 2,949,642 | 8/1960 | Lieberman | 18/90 |
| 2,981,920 | 4/1961 | Jackson | 339/89 |
| 2,983,779 | 5/1961 | Dumire et al. | 174/75 |
| 3,066,272 | 11/1962 | Quackenbush | 439/595 |
| 3,321,732 | 5/1967 | Forney, Jr. | 339/89 |
| 3,489,988 | 1/1970 | Carnaghan | 439/274 |
| 3,622,939 | 11/1971 | Forney, Jr. | 339/890 |
| 3,681,742 | 8/1972 | Newman | 339/213 T |
| 3,824,526 | 7/1974 | Glover | 439/320 |
| 3,945,701 | 3/1976 | Boeke et al. | 439/320 |
| 3,982,808 | 9/1976 | Marechal | 339/88 R |
| 3,990,765 | 11/1976 | Hill | 434/932 |
| 4,060,298 | 11/1977 | Gearin | 339/48 |
| 4,218,110 | 8/1980 | Giannaula et al. | 339/154 |
| 4,233,731 | 11/1980 | Clabburn et al. | 439/932 |
| 4,296,986 | 10/1981 | Herrmann, Jr. | 339/89 |
| 4,323,607 | 4/1982 | Nishimura et al. | 439/932 |
| 4,678,260 | 7/1987 | Gallusser et al. | 439/320 |
| 4,678,260 | 7/1987 | Gallusser | 439/607 |
| 4,761,146 | 8/1988 | Sohoel | 439/275 |
| 4,826,450 | 5/1989 | Crane et al. | 439/578 |

FOREIGN PATENT DOCUMENTS 1017574  1/1966  United Kingdom .

*Primary Examiner*—Gary F. Paumen
*Assistant Examiner*—Hien D. Vu
*Attorney, Agent, or Firm*—Dvorak and Traub

[57] ABSTRACT

An insulated locking sleeve arrangement including a connector disposed about mating male and female conductor plugs to fixedly retain the conductor plugs in mating relationship and to isolate the conductor plugs from the environment. A heat shrinkable tubing may also be applied over the locking sleeve connector to act as a moisture barrier and also to relieve strain between the conductor cable and the locking sleeve connector.

16 Claims, 2 Drawing Sheets

LOCKING SLEEVE CONNECTOR FOR CONDUCTOR CABLE

The present invention relates to a locking sleeve connector for an electrical conductor cable. Specifically, the present invention relates to an insulated locking sleeve connector that is disposed about mating male and female conductor plugs to fixedly retain the conductor plugs in mating relationship and to isolate the conductor plugs from the environment.

Electrical conductor cables are used in many industrial applications including the supply of single phase and three phase electric power. Conductor cables that may be removably interconnected often have the advantage of convenience over permanently connected conductor cables, particularly in experimental circuit configurations and in applications where the conductor cables provide power to a location on a temporary basis. One such application is the entertainment film making industry which requires the temporary application of electric power to onsight filming locations. Typically, electric power is produced by one or more mobile generator units and the power is then distributed by a network of conducting cables throughout the filming location to the filming equipment and temporary structural facilities. In the past, removably interconnected conductor cables have been used in the film making industry, and these cables have been connected by a standard male and female connector plug fixedly retained by frictional forces. The standard cable connector used throughout the film making industry is a single pole separable connector plug NEC CODE 520-53(K) made from brass and having no insulation. These connector plugs however have the disadvantage that they are easily disconnected and are exposed to the environment thereby creating a serious risk of electrical shock and loss of power. It has been suggested to apply adhesive tape over the conductor plug in order to avoid disconnection of the male and female ends of the conductor plug and to provide electrical insulation. Tape however has the disadvantage that it is often haphazardly applied, is difficult to remove and may not provide an adequate moisture barrier. It has also been suggested to apply a phenolic plastic sleeve about the conductor plug, but these phenolic plastic materials contain asbestos and are no longer manufactured. There is therefore a demonstrated need for an advancement in the art of electrical cable connectors that solves the problems discussed above.

It is an object of the present invention to provide a novel locking sleeve connector for a conductor cable.

It is an object of the present invention to provide a novel locking sleeve connector that may readily be applied to standard conductor plugs.

It is also an object of the present invention to provide a locking sleeve connector that fixedly retains the conductor plugs in electrical contact and provides a moisture barrier.

It is a further object of the present invention to provide a locking sleeve connector that is economical and easy to use.

The present invention is directed toward an insulated locking sleeve connector disposed about mating male and female conductor plugs to fixedly retain the conductor plugs in mating relationship and to isolate the conductor plugs from the environment. A heat shrinkable tubing may also be applied over the locking sleeve connector to act as a moisture barrier and also to relieve strain between the conductor cable and the locking sleeve connector.

These and other objects, features and advantages will become apparent upon consideration of the following DETAILED DESCRIPTION OF THE INVENTION and the accompanying drawings.

DETAILED DESCRIPTION OF THE INVENTION

Figure 1:
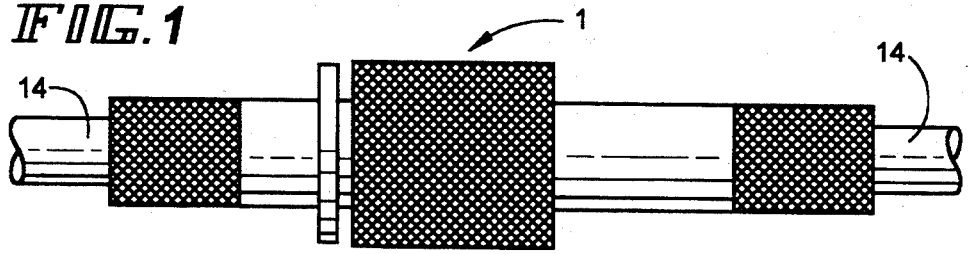
FIG. 1 is a side view of a locking sleeve connector applied to a single mating conductor cable.
Figure 2:
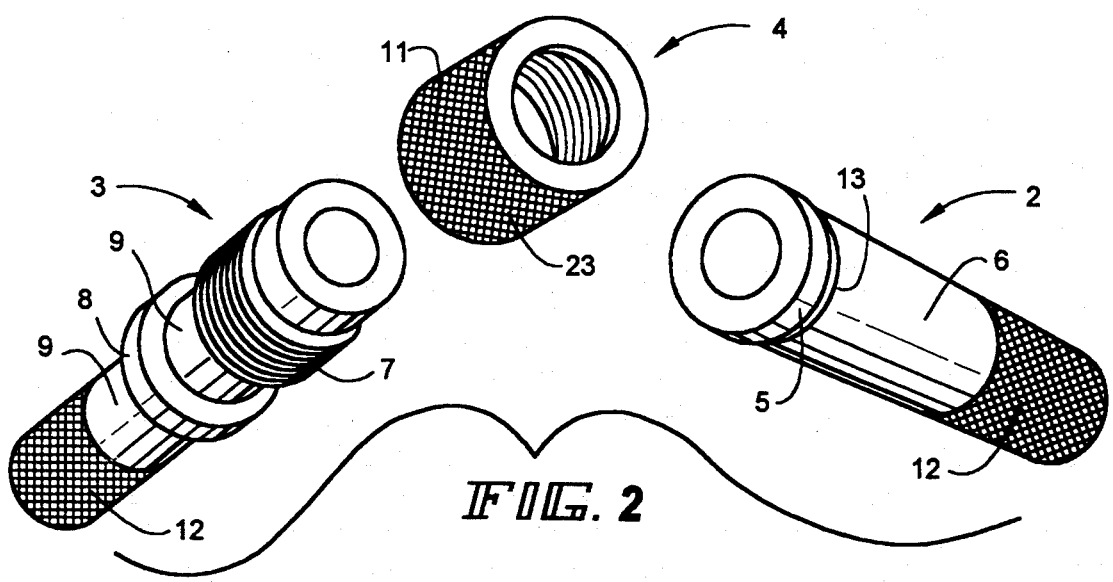
FIG. 2 is an exploded perspective view of the locking sleeve connector of FIG. 1.

FIG. 1 is a side view of a locking sleeve connector 1 applied to a mating conductor cable 14 and FIG. 2 is an exploded perspective view of the locking sleeve conductor of FIG. 1 generally comprising a flanged connector 2, a threaded connector 3 and a connector coupling 4. The locking sleeve connector 1 is preferably formed of an electrical and thermal insulating material with strong mechanical properties and a low moisture absorbing characteristic. The locking sleeve connector 1 may for example be made from VALOX ® manufactured by General Electric Company and comprised of a 45% glass/mineral reinforced polyester having a high tensile and flexural strength and UL ® approved electrical and thermal insulating properties. The locking sleeve connector 1 may also be color coded to assist in identifying the conductor cable 14 when more than one cable comprises a network of conductor cables.

Figure 3:
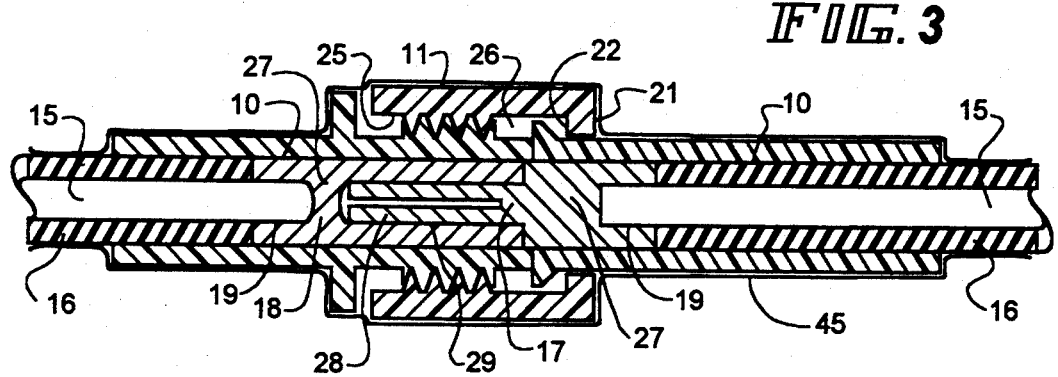
FIG. 3 is a sectional view of FIG. 1.
Figure 3A:
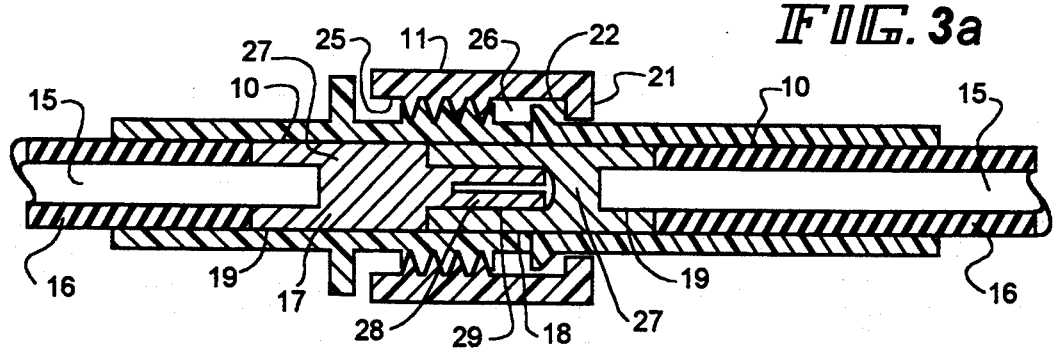
FIG. 3A is a sectional view of FIG. 1.

The mating conductor cable 14 generally comprises conductive wires 15 encased by a protective insulating sheath 16. FIG. 3 is a sectional view of FIG. 1 showing the conductive wires 15 interconnected by a pair of mating male and female conductor plugs 17 and 18 each having a base 27 with a plug recess 19 for fixedly receiving an end of the conductive wire 15. The male conductor plug 17 also has a protruding member 28 that is removably disposed in a complementary cavity 29 of the female conductor plug 18. A frictional force retains the male and female conductor plugs 17 and 18 in mating relationship. The conductor cable 14 may for example comprise a braided copper wire encased by a UL ® approved insulator although other insulated conducting cables known in the art may also be used. The mating male and female conductor plugs 17 and 18 are for example brass single pole separable connectors NEC CODE 520-53(K).

The flanged connector 2 comprises a cylindrical body 6 having an annular flange 5 including a side surface 13 extending substantially radially outward from an end of the cylindrical body 6. The threaded connector 3 comprises a cylindrical body 9 having an annular flange 8 extending radially outward from an intermediate portion of the cylindrical body 9. The threaded connector 3 also comprises a screw thread 7 disposed about an end of the cylindrical body 9. The flanged connector 2 and the threaded connector 3 each have a conductor bore 10 extending concentrically through the cylindrical body portions 6 and 9, respectively. The flanged connector 2 and the threaded connector 3 each may have a knurled outer surface 12 to assist in handling the locking sleeve connector 1. The connector coupling 4 is comprised of a cylindrical body 11 having a connector bore 26 and an annular flange 21 including an inner side surface 22 extending substantially radially inward from one end of the cylindrical body 11. A screw thread 25 is disposed on an inner surface of cylindrical body 11 and is threadedly engageable with the screw thread 7 of the threaded connector 3. The connector coupling 4 may also have a knurled outer surface 23 to assist in handling the locking sleeve connector 1.

Figure 4:
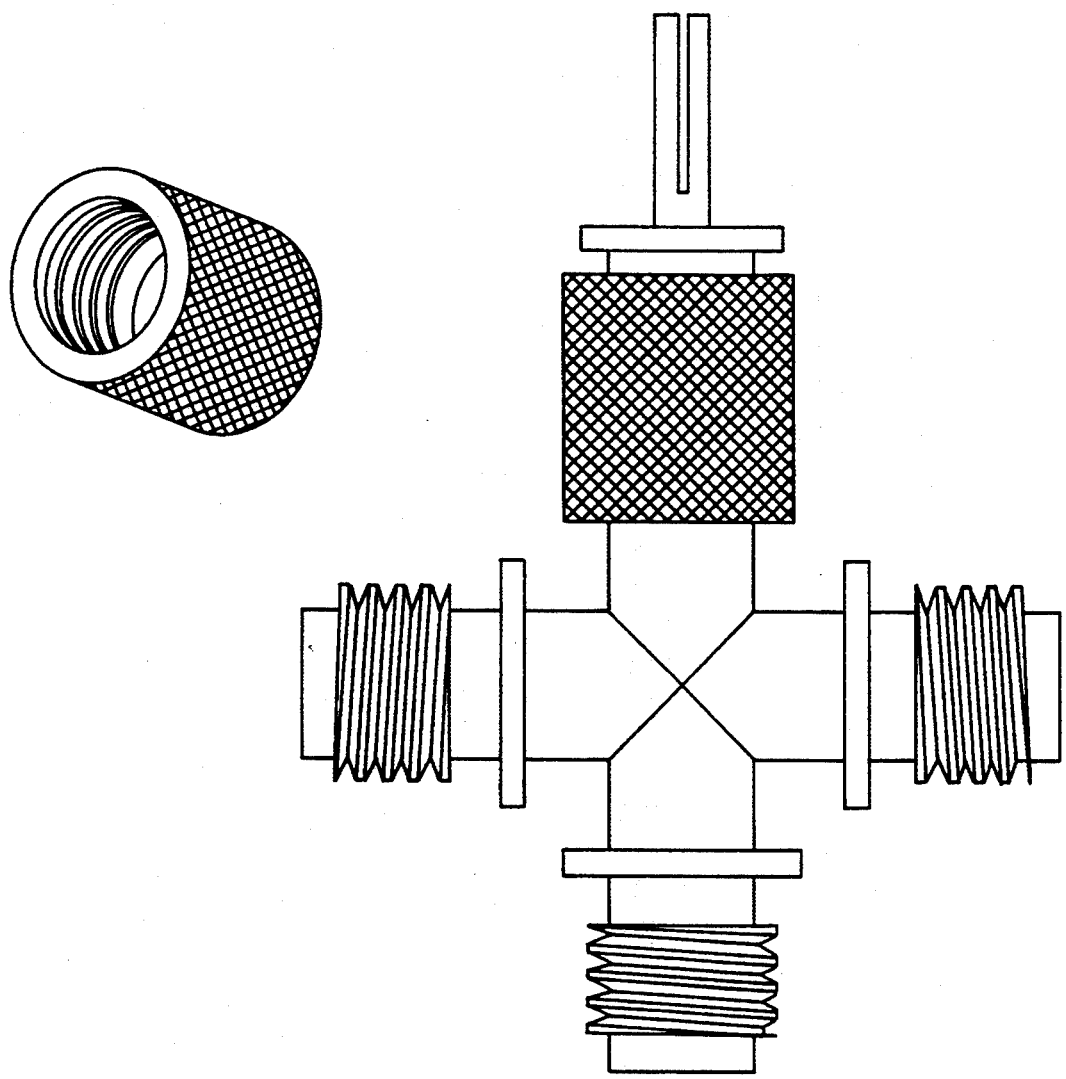
FIG. 4 is an alternative embodiment of the locking sleeve connector of FIG. 1.

In an alternative embodiment of the locking sleeve connector 1 the flanged connector 2 may be connected to one or more flanged connectors in a "Y" or "Star" configuration to form a junction at which a plurality of conductor cables may be interconnected by a corresponding number of threaded connectors 3. In a further alternative embodiment, the threaded connector 3 may be connected to one or more threaded connectors to form a junction similar to that formed by the flanged connectors discussed above. FIG. 4 is a 4-way flanged connector junction having one flanged connector and three threaded connectors. It is noted that the disclosure is not limited to the 4-way connector, and in fact the multiple connectors may include various numbers of both male and/or female connectors.

In operation, the base 27 of the male conductor plug 17 is disposed in the conductor bore 10 of the flanged connector 2 so that the protruding member 28 extends outwardly from the conductor bore 10 beyond the annular flange 5. The female conductor plug 18 is disposed in the conductor bore 10 of the threaded connector 3 so that the female conductor plug 18 is positioned flush with the threaded end of the threaded connector 3. The male and female conductor plugs 17 and 18 are press-fit in the conductor bores 10 of the flanged connector 2 and the threaded connector 3, respectively, and are fixedly retained therein by frictional forces. Alternatively, the male conductor plug 17 may be disposed in the bore 10 of the threaded connector 3 and the female conductor plug 18 may be disposed in the bore 10 of the flanged connector 2.

The connector coupling 4 is concentrically disposed about the cylindrical body 6 of the flanged connector 2 so that the inner side surface 22 of the annular flange 21 may be disposed toward and in contact with the side surface 13 of the annular flange 5. The connector coupling 4 is most conveniently disposed about the flanged connector 2 before the male or female conductor plug 17 or 18 is press-fit into the bore 10 of the flanged connector 2 as discussed above. When the male and female conductor plugs 17 and 18 are engaged in mating relationship, the flange 5 of the flanged connector 2 will be proximate the threaded end of the threaded connector 3 so that the inner screw thread 25 of the connector coupling 4 may engage the screw thread 7 of the threaded connector 3 by rotating the connector coupling 4. As the screw thread 25 of the connector coupling 4 is engaged with the screw thread 7 of the threaded connector 3, the inner side surface 22 of the annular flange 21 will engage the side surface 13 of the annular flange 5 and displace the flanged connector 2 toward the threaded connector 3 so that the male and female conductor plugs 17 and 18 fully engage in mating relationship. The male and female conductor plugs 17 and 18 are then fixedly retained in mating relationship by the insulated locking connector sleeve 1.

The engagement of the male and female conductor plugs 17 and 18 may be provided with an additional degree of moisture protection by applying a section of heavy-duty polyolefin shrink tubing 45 over the locking connector sleeve 1 and a section of conductor cable 14 on both sides of the locking connector sleeve 1. The application of heat to the shrink tubing will create a skin-tight moisture seal over the locking sleeve connector 1 and conducting cable 14 and substantially relieve any strain between the conductor cable 14 and the locking sleeve connector 1.

Additionally, flexible O-ring type seals may be employed for moisture protection.

The foregoing is a description enabling one of ordinary skill in the art to make and use the preferred embodiments of the present invention. It will be appreciated by those skilled in the art that there exists variations, modifications and other equivalents to the embodiments disclosed. The present invention therefore is to be limited only by the scope of the appended claims.

What is claimed is:

1. A locking sleeve connector in combination with a single pair of mating male and female conductor plugs for relatively high current and voltage electrical power transmission, the male conductor plug having a conductor base, a protruding member extending from the base and a recess in the base for receiving a first conducting wire, and the female conducting plug having a base, a cavity for receiving the protruding member of the male conductor plug and a recess in the base for receiving a second conducting wire, the locking sleeve connector further comprising:

a dielectric flanged connector having a cylindrical body with a single bore extending therethrough and an annular flange extending radially outward from an end of the cylindrical body, the base of the male conductor plug being fixedly disposed in the bore of the cylindrical body of the flanged connector so that the protruding member of the male conductor plug extends from the flanged connector, the base of the male conductor plug being press-fit in the single bore of the flanged connector so that the base of the male conductor plug is in direct contact with the flanged connector;

a threaded dielectric connector having a cylindrical body with a single bore extending therethrough and a screw thread formed on and around an end of the cylindrical body, the female conductor plug being fixedly disposed in the bore of the cylindrical body of the threaded connector, the female conductor plug being press-fit in the single bore of the threaded connector so that the base of the female conductor plug is in direct contact with the threaded connector; and a dielectric connector coupling having a cylindrical body with a bore extending therethrough, an annular flange and a screw thread disposed on the inner surface of the cylindrical body, the connector coupling being concentrically disposed about the cylindrical body of the flanged connector so the annular flange of the connector coupling is engageable with the annular flange of the flanged connector and the screw threads of the connector coupling are engageable with the screw threads of the threaded connector to engage and fixedly retain the male conductor plug in mating relationship with the female conductor plug.

2. The locking sleeve connector of claim 1, wherein the annular flange of the flanged connector comprises a side surface extending substantially radially outward from the cylindrical body of the flanged coupling and the annular flange of the connector coupling comprises an inner side surface extending substantially radially inward from the cylindrical body of the connector coupling, the inner side surface of the connector coupling engaging the side surface of the flanged connector as the connector coupling engages the threaded connector assisting engagement of the male conductor plug in mating relationship with the female conductor plug.

3. The locking sleeve connector of claim 2, wherein the recess of the base of the male and female conductor plugs each has a conducting wire fixedly disposed in the recess, and the conducting wire extends outwardly from the base of each of the threaded connector and the flanged connector, respectively.

4. The locking sleeve connector of claim 2, wherein the threaded connector further comprises an annular flange disposed about an intermediate portion of an outer surface of the cylindrical body of the threaded connector.

5. The locking sleeve connector of claim 3, further comprising a moisture barrier disposed over the locking sleeve connector and over the conducting wires extending from the bore of the threaded connector and the bore of the flanged connector, wherein said moisture barrier relieves strain between the conducting wires and the locking sleeve connector.

6. The locking sleeve connector of claim 5, wherein the moisture barrier is a polyolefin shrink tubing.

7. The locking sleeve connector of claim 1, wherein the locking sleeve connector is comprised of VALOX®.

8. The locking sleeve connector of claim 6, wherein the locking sleeve connector is comprised of VALOX®.

9. A locking sleeve connector in combination with a single pair of mating male and female conductor plugs for relatively high current and voltage power transmission, the male conductor plug having a conductor base, a protruding member extending from the base and a recess in the base for receiving a first conducting wire, and the female conducting plug having a base, a cavity for receiving the protruding member of the male conductor plug and a recess in the base for receiving a second conducting wire, the locking sleeve connector further comprising:

a dielectric flanged connector having a cylindrical body with a single bore extending therethrough and an annular flange extending radially outward from an end of the cylindrical body, the female conductor plug being fixedly disposed in the bore of the cylindrical body of the flanged connector, the base of the female conductor plug being press-fit in the single bore of the flanged connector so that the base of the female conductor plug is in direct contact with the flanged connector;

a threaded dielectric connector having a cylindrical body with a single bore extending therethrough and a screw thread formed on and around an end of the cylindrical body, the base of the male conductor plug being fixedly disposed in the bore of the cylindrical body of the threaded connector so that the protruding member of the male conductor plug extends from the threaded connector, the base of the male conductor plug being press-fit in the single bore of the threaded connector so that the base of the male conductor plug is in direct contact with the threaded connector; and a dielectric connector coupling having a cylindrical body with a bore extending therethrough, an annular flange and a screw thread disposed on the inner surface of the cylindrical body, the connector coupling being concentrically disposed about the cylindrical body of the flanged connector so the annular flange of the connector coupling is engageable with the annular flange of the flanged connector and the screw threads of the connector coupling are engageable with the screw threads of the threaded connector to engage and fixedly retain the male conductor plug in mating relationship with the female conductor plug.

10. The locking sleeve connector of claim 9, wherein the annular flange of the flanged connector comprises a side surface extending substantially radially outward from the cylindrical body of the flanged coupling and the annular flange of the connector coupling comprises an inner side surface extending substantially radially inward from the cylindrical body of the connector coupling, the inner side surface of the connector coupling engaging the side surface of the flanged connector as the connector coupling engages the threaded connector assisting engagement of the male conductor plug in mating relationship with the female conductor plug.

11. The locking sleeve connector of claim 10, wherein the recess of the base of the male and female conductor plugs each has a conducting wire fixedly disposed in the recess, and the conducting wire extends outwardly from the base of each of the threaded connector and the flanged connector, respectively.

12. The locking sleeve connector of claim 10, wherein the threaded connector further comprises an annular flange disposed about an intermediate portion of an outer surface of the cylindrical body of the threaded connector.

13. The locking sleeve connector of claim 11, further comprising a moisture barrier disposed over the locking sleeve connector and over the conducting wires extending from the bore of the threaded connector and the bore of the flanged connector, wherein said moisture barrier relieves strain between the conducting wires and the locking sleeve connector.

14. The locking sleeve connector of claim 13, wherein the moisture barrier is a polyolefin shrink tubing.

15. The locking sleeve connector of claim 9, wherein the locking sleeve connector is comprised of VALOX®.

16. The locking sleeve connector of claim 14, wherein the locking sleeve connector is comprised of VALOX®.

* * * * *